Patented Feb. 4, 1941

2,230,791

UNITED STATES PATENT OFFICE 2,230,791

MANUFACTURE OF 2-HYDROXYNAPHTHALENE-4-SULPHONIC ACID AND SUBSTITUTION PRODUCTS THEREOF

Walther Benade, Wolfen, Kreis Bitterfeld, Werner Keller, Dessau in Anhalt, and Kurt Berger, Jessnitz in Anhalt, Germany, assignors to General Aniline & Film Corporation, a corporation of Delaware No Drawing. Application May 13, 1939, Serial No. 273,410. In Germany May 16, 1938

4 Claims. (Cl. 260—512)

The present invention relates to the manufacture of 2-hydroxynaphthalene-4-sulphonic acid and substitution products thereof, by subjecting diazotized 1-amino-2-hydroxynaphthalene-4-sulphonic acid or a substitution product thereof to the action of a reducing agent, such as grape sugar, the reaction being performed in an alkaline solution. The present process leads to very pure products which are obtained, with a very good yield, in a one-stage process without application of metals or metal salts.

The following examples illustrate the invention, the parts being by weight:

*Example 1.*—50 parts of diazotized 1-amino-2-hydroxynaphthalene-4-sulphonic acid are dissolved in 200 parts of water, so as to form a neutral solution, and the reaction mixture is then mixed with a solution of 16 parts of grape sugar in 40 parts of water. The solution thus obtained is then gradually run into a hot solution of 16 parts of sodium hydroxide in 150 parts of water. The evolution of nitrogen sets in immediately; it ceases as soon as the solutions have been mixed completely.

The solution of 2-hydroxynaphthalene-4-sulphonic acid, which is obtained with a yield of more than 90% may directly be used for the manufacture of dyes. In case the acid shall be isolated, the solution is neutralized, then evaporated and salted out. Another method of isolating the 2-hydroxynaphthalene-4-sulphonic acid thus obtained consists in gradually adding thereto an aryl-sulphonic acid chloride, such as benzene-sulphonic acid chloride and thus transforming it into an aryl-sulphonic acid ester; the latter, when salted out even in a dilute solution, separates in a quantitative amount.

*Example 2.*—A solution of 28.45 parts of diazotized 6-chloro-1-amino-2-hydroxynaphthalene-4-sulphonic acid in 90 parts of water and neutralized with caustic soda, is mixed with a solution of 8 parts of grape sugar in 20 parts of water. The solution thus obtained is slowly added to a hot solution of 8 parts of sodium hydroxide in 75 parts of water. Evolution of nitrogen sets in immediately and is finished after a short time. The solution of 6-chloro-2-hydroxynaphthalene-4-sulphonic acid obtained in a yield of more than 90 per cent. of the theoretical, may immediately be used for the manufacture of dyes. If separation of the acid is desired, this may be done as indicated in Example 1 in form of its sodium salt or in form of an aryl sulphonic acid ester, for instance, of the benzene sulphonic acid ester.

*Example 3.*—When substituting 32.9 parts of diazotized 6-bromo-1-amino-2-hydroxynaphthalene-4-sulphonic acid for the 28.45 parts of the corresponding chloro-compound mentioned in Example 1, 6-bromo-2-hydroxynaphthalene-4-sulphonic acid is obtained with a yield corresponding to more than 90 per cent. of the theoretical.

*Example 4.*—58.8 parts of diazotized 6-carboxy-1-amino-2-hydroxynaphthalene-4-sulphonic acid obtainable from 2,6-hydroxynaphthoic acid by transforming into the nitroso compound and reaction with a bisulphite, are mixed with 180 parts of water and neutralized with caustic soda. After addition of a solution of 16 parts of grape sugar in 40 parts of water, the mixture is run gradually to a hot solution of 16 parts of sodium hydroxide in 150 parts of water. Evolution of nitrogen sets in immediately and finishes if the total amount of the diazo compound is run in. By addition of a mineral acid the 6-carboxy-2-hydroxynaphthalene-4-sulphonic acid is separated in a crystalline form and with a yield of 95 per cent. of the theoretical.

*Example 5.*—If in Example 4 66 parts of diazotized 1-amino-2-hydroxynaphthalene-4,6-disulphonic acid are substituted for the diazotized 6-carboxy-1-amino-2-hydroxynaphthalene-4-sulphonic acid the 2-hydroxynaphthalene-4,6-disulphonic acid is formed with a nearly quantitative yield.

*Example 6.*—If under the conditions indicated in Example 1 59 parts of diazotized 6-nitro-1-amino-2-hydroxynaphthalene-4-sulphonic acid are treated, 6-nitro-2-hydroxynaphthalene-4-sulphonic acid is obtained in a nearly quantitative yield. The acid may be separated in form of yellow crystals by addition of a mineral acid or in form of an aryl-sulphonic acid ester.

It is obvious that our invention is not limited to the foregoing examples or to the specific details given therein. Instead of grape sugar preferably applied according to the examples as reducing agent, there may be used other reducing sugars and in the claims following hereafter such other sugars are considered to be equivalents of grape sugar.

What we claim is:

1. The process for manufacturing 2-hydroxy-naphthalene-4-sulphonic acids in one stage which comprises subjecting the diazo compound of an amine corresponding to the general formula

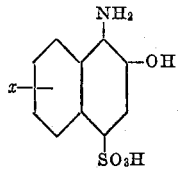

wherein $x$ is a member of the group consisting of hydrogen, hologen, —NO$_2$, —COOH and —SO$_3$H, to a reduction by heating it in the presence of water and a caustic alkali with grape sugar.

2. The process which comprises subjecting diazotized 1-amino-2-hydroxynaphthalene-4-sulphonic acid to a reduction by heating it in the presence of water and a caustic alkali with grape sugar.

3. The process which comprises subjecting diazotized 1-amino-2-hydroxy-6-nitronaphthalene-4-sulphonic acid to a reduction by heating it in the presence of water and a caustic alkali with grape sugar.

4. The process which comprises subjecting diazotized 1-amino-2-hydroxy-6-halogeno-naphthalene-4-sulphonic acid to a reduction by heating it in the presence of water and a caustic alkali with grape sugar.

WALTHER BENADE.
WERNER KELLER.
KURT BERGER.